6856X
E. WELLS.
Fruit-Gatherer.
Patented Dec. 6, 1831.
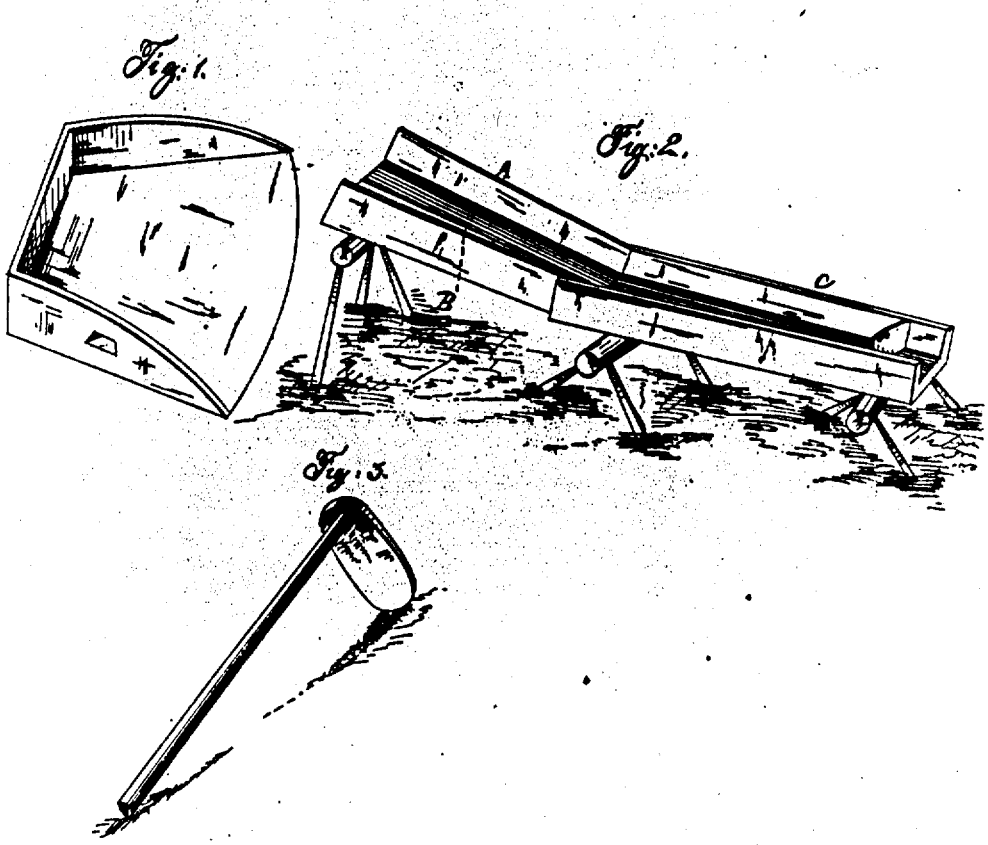

6856X

UNITED STATES PATENT OFFICE.

ELIAS WELLS, OF DUXBURY, VERMONT.

IMPROVEMENT IN THE MODE OF GATHERING AND CLEANING FRUIT BY MACHINERY.

Specification forming part of Letters Patent dated December 6, 1831.

*To all whom it may concern:*

Be it known that I, ELIAS WELLS, of Duxbury, in the county of Washington and State of Vermont, have invented, constructed, made, and applied to use a new and useful Improvement in the Mode of Gathering and Cleaning Fruit by Machinery at one Operation, called the "Apple-Machine," specified in the words following, viz:

This improvement in the mode of gathering and cleansing fruit consists in collecting the fruit into the fan by means of a hoe made of wood for that purpose, and when a sufficient quantity of fruit is collected into the fan it is thrown into the upper end of the spout, by which means the good fruit passes down and is deposited in any kind of reservoir placed at the lower end of the spout, and the leaves, grass, and decayed fruit are lodged in the spout, which may be cleared as occasion requires. The spout is made in three separate pieces, so as to be easily moved to any part of the orchard.

In testimony that the above is a true specification of my said improvement, as above described, I have hereto set my hand the 11th day of November, A. D. 1831.

ELIAS WELLS.

Witnesses:
ORAMEL H. SMITH,
WILLIAM BILLINGS.